Patented Mar. 6, 1923.

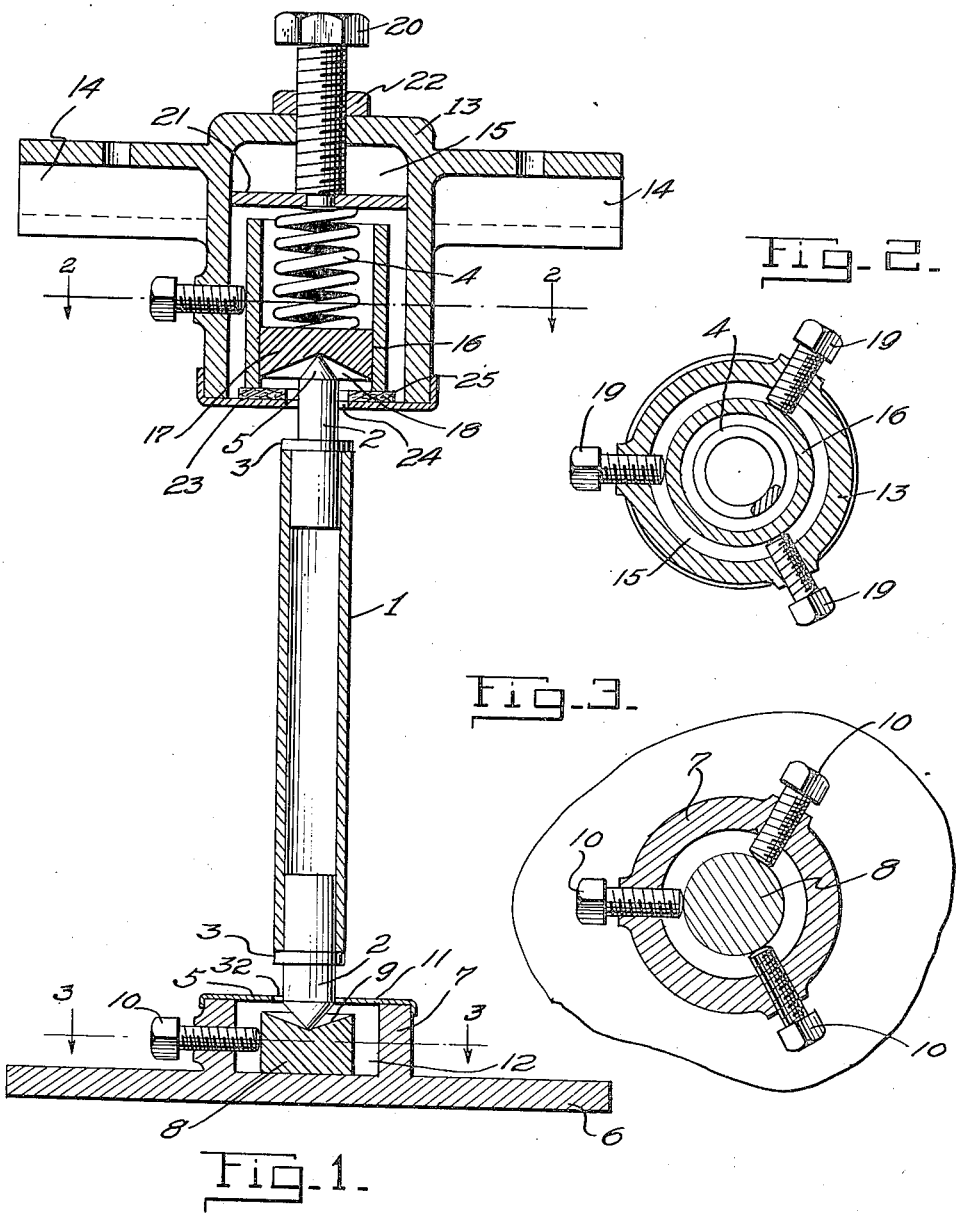

1,447,587

UNITED STATES PATENT OFFICE.

ABRAHAM L. CALVERT, OF DETROIT, MICHIGAN.

ADJUSTABLE BEARING.

Application filed June 5, 1920. Serial No. 386,862.

*To all whom it may concern:*

Be it known that I, ABRAHAM L. CALVERT, a citizen of the United States, residing at Detroit, county of Wayne, State of Michigan, have invented a certain new and useful Improvement in Adjustable Bearings, and declare the following to be a full, clear, and exact description of the same, such as will enable others skilled in the art to which it pertains to make and use the same, reference being had to the accompanying drawings, which form a part of this specification.

This invention relates to adjustable bearings and the object of the invention is to provide a bearing which is adjustable to take up wear and adapted for use more particularly with vertical shafts. A further object of the invention is to provide an adjustable bearing which is not affected by contraction or elongation of the shaft due to heat or cold. In the ordinary type of bearing elongation of the shaft causes the bearing to bind and hold the shaft from rotation. The principal object of this invention is to provide a bearing which will not bind the shaft and which applies the proper tension to the shaft ends at all times. A still further object of the invention is to provide a bearing which is self lubricating and which is adjustable both vertically and horizontally. A novel feature of the invention is comprised in the spring pressed bearing block which is adjustable to take up wear on the shaft ends and which is adjustable horizontally by a series of horizontal screws, the casing for the bearing being adapted to be filled with a lubricant for lubricating the shaft in the bearing. These objects and the several novel features of the invention are hereinafter more fully described and claimed and the preferred form of construction by which these objects are attained is shown in the accompanying drawings in which—

Fig. 1 is a vertical section through a shaft provided with bearings at each end embodying my invention.

Fig. 2 is a section taken on line 2—2 of Fig. 1.

Fig. 3 is a section taken on line 3—3 of Fig. 1.

I have illustrated in Fig. 1 a tube 1 in which the shaft ends or bearing points 2 may be positioned, the bearing points being each provided with a collar 3 to prevent the points from being telescoped within the tube due to pressure of the spring 4. Each of these bearing points 2 are provided with conical ends 5 ending in a sharp point and it is to be understood while I have shown a tube provided with bearing points, a solid shaft is equally adaptable if provided with conical points 5 at each end. Supported on the base 6 is a cup shaped member 7 formed integrally therewith if desired and within this part 7 is a bearing block 8 provided with a conical recess 9 in which the point 5 of the member 2 seats. It is to be noted that the sides of the recess 9 are set at a much less angle than the sides of the conical point 5 thereby allowing the said parts to come in contact only at the points, the said conical recess 9 centering the shaft in the block. As is shown in Fig. 3, I provide several screws 10 threaded through the cup shaped part 7 on the base 6 and adapted to engage the sides of the bearing block 8; adjustment of the said screws 10 adjusting the bearing block 8 horizontally. A cap 11 is provided forming a cover for the cup shaped member 7 and having an aperture 32 therein through which the shaft extends and of sufficient diameter to allow horizontal adjustment of the shaft. The central chamber 12 of the cup is filled with a lubricant which provides lubrication for the bearing block and shaft end. At the upper end of the shaft I provide a cup shaped member 13 which may be provided with arms 14 if desired by which the member may be supported on a frame work or other suitable support, the support being preferably stationary. The cup member 13 is provided with a large central chamber 15 on the interior thereof and within this chamber 15 is a hollow cylinder 16 open at both ends the said cylinder providing a guide for the bearing block 17 which is positioned therewithin. The bearing block 17 is similar to the bearing block 8 being provided with a conical recess 18 in which the upper point 5 of the shaft centers. The cylinder 16 is adjustable horizontally by the screws 19 threaded through the wall of the casing 13 and adapted to engage the wall of the cylinder 16. Threaded through the upper end of the casing 13 is a large set screw 20 provided with a plate 21 in which the screw 20 is rotatably mounted at the lower end the said plate 21 fitting the chamber 15 in the member 13. Within the cylinder 16 between the bearing block 17 and plate 21 is a spring 4 adapted to hold the bearing block 17 tightly against the point 5 of the shaft, the said set screw 20 being provided with a lock nut 22 by which the set screw may be secured at any position in the member 13. Secured to the lower end of the member 13 is a cap 23 provided with an enlarged aperture 24 to allow horizontal adjustment of the shaft and on this cap 23 is a felt or leather washer 25 shaped to fit about the shaft end and prevent leakage of lubricant with which the recess 15 is filled, the lubricant lubricating the bearing block and upper shaft end 5.

In operation the device is set up as shown in Fig. 1, the members 6 and 13 being preferably secured to solid supports. It can thus be seen that by rotation of the set screw 20 the plate 21 is moved downward thereby compressing the spring 4 and applying pressure on the bearing block 17 and to the point 5. In this manner any wear that may occur on the shaft ends may be taken up. The tension of the spring 4 may be adjusted and the correct point at which to adjust the tension of the spring may be found by practice, too great a tension causing the shaft to bind and be prevented to some extent from rotation and too little tension allowing the shaft to become loose and not center correctly in the conical recesses in the bearing blocks. If desired a bearing similar to that shown in the upper end of Fig. 1 may be applied to the lower end of the shaft in the said figure but where it is necessary that no vertical movement of the shaft be allowed, the bearing at both ends may be somewhat unsatisfactory the shaft being liable to slight vertical movements against the tension of the springs 4. This bearing may also be used on horizontal shafts it providing an excellent bearing by which wear may be taken up and provided a bearing adapted to always center the shaft correctly. By adjustment of the set screws 10 in the lower bearing and the set screws 19 in the upper bearing, the shaft may be moved horizontally, or if the shaft is not in exactly vertical position, it may be set exactly vertical and in practice this adjustable feature will be found very useful in many different ways.

From the foregoing description it becomes evident that the bearing is very efficient in operation, of comparatively simple construction, of low manufacturing cost and provides a bearing in which the shaft is always centered by tension of the spring, which will not easily get out of order and which effectively accomplishes the objects desired.

Having thus fully described my invention, its utility and mode of operation, what I claim and desire to secure by Letters Patent of the United States is—

1. In a bearing for shafts pointed at each end, a cup shaped support at one end of the shaft provided with a central chamber, a block positioned in the cup shaped member and provided with a conical recess for the end of the shaft, means for adjusting the block transversely of the cup shaped member, a casing at the opposite end of the shaft provided with a central chamber open at one end, a cylindrical member within the chamber, a series of set screws threaded through the casing wall by which the cylindrical member may be adjusted transversely of the casing, a bearing block reciprocably mounted within the said cylindrical member having a conical recess to receive the pointed end of the shaft, a set screw threaded into the chamber and extending longitudinally of the shaft, a plate carried by the inner end of the set screw, a compression spring between the bearing block and plate, a cap for the open end of the casing provided with a central aperture through which the shaft end extends and a packing secured about the shaft end within the casing preventing lubricant from leaking therefrom.

2. In a bearing for shafts pointed at each end, a stationarily mounted casing provided with a central chamber having an opening at one end into which the shaft extends, a set screw extending longitudinally through the casing, a plate fitting the interior of the chamber and mounted on the end of the set screw, a lock nut on the set screw for locking the set screw in position, a cylindrical member open at both ends positioned within the chamber, a series of set screws extending through the sides of the casing by which the cylindrical member may be adjusted transversely, a bearing block provided with a conical recess for the shaft end reciprocably mounted within the cylindrical member, a compression spring extending between the bearing block and plate, a packing fitting about the shaft end within the casing, and a cap for the open end of the casing having a central aperture of greater diameter than the diameter of the shaft end and providing a support for the washer.

3. In a bearing for shafts pointed at each end, a casing stationarily mounted in position and provided with a central chamber open at one end, a cylindrical member within the central chamber, means for adjusting the cylindrical member transversely within the chamber, a bearing block reciprocably mounted within the cylindrical member and having a conical recess to receive the pointed shaft end, the shaft end extending into the central chamber through the open end, a plate adjustable longitudinally of the chamber, a spring between the bearing block and plate forcing the bearing block to engagement with the pointed shaft end, a cap fitting over the open end of the casing and provided with an aperture of greater diameter than the diameter of the shaft end and a packing mounted on the cap within the chamber and fitting tightly about the shaft.

4. In a bearing for shafts pointed at each end, a stationary member provided with a central chamber open at one end, a cylindrical member within the chamber, a series of set screws threaded through the casing wall by which the cylindrical member may be positioned transversely of the stationary member, a bearing block reciprocably mounted within the said cylindrical member having a conical recess to receive the pointed end of the shaft, a set screw threaded through the end of the casing, a plate carried by the inner end of the set screw, a compression spring between the bearing block and plate, a cap for the open end of the casing provided with a central aperture through which the shaft end extends and a packing secured about the shaft end within the casing preventing lubricant from leaking therefrom.

5. A bearing for shafts comprising in combination with a vertical shaft, a laterally adjustable bearing block at the lower end, said block being fixed as to vertical movement, a bearing block for the upper end of the shaft movable in a vertical plane, a spring holding the block in engagement with the shaft, and means for laterally adjusting the position of the block.

6. A bearing for vertical shafts permitting elongation and contraction thereof due to temperature variations comprising in combination with a shaft having conical ends, a bearing block for the lower end of the shaft fixed as to vertical movement, a bearing block for the upper end of the shaft, a cylindrical member in which the block is movable vertically, a spring engaging the block yieldingly resisting movement of the block in the casing, and means for laterally adjusting the position of the cylindrical member.

In testimony whereof, I sign this specification.

ABRAHAM L. CALVERT.